United States Patent [19]
Allen et al.

[11] Patent Number: 5,242,671
[45] Date of Patent: Sep. 7, 1993

[54] PROCESS FOR PREPARING POLYSILICON WITH DIMINISHED HYDROGEN CONTENT BY USING A FLUIDIZED BED WITH A TWO-STEP HEATING PROCESS

[75] Inventors: Robert H. Allen; James E. Boone, both of Baton Rouge, La.

[73] Assignee: Ethyl Corporation, Richmond, Va.

[21] Appl. No.: 791,882

[22] Filed: Nov. 13, 1991

Related U.S. Application Data

[63] Continuation-in-part of Ser. No. 255,967, Oct. 11, 1988, abandoned.

[51] Int. Cl.[5] ............................................. C01B 33/02
[52] U.S. Cl. ..................................... 423/349; 427/213
[58] Field of Search ..................... 423/348, 349, 350; 427/213

[56] References Cited

U.S. PATENT DOCUMENTS

| | | | |
|---|---|---|---|
| 4,237,150 | 12/1980 | Wiesmann | 427/74 |
| 4,237,151 | 12/1980 | Strongin et al. | 427/74 |
| 4,424,199 | 1/1984 | Iya | 423/349 |
| 4,537,759 | 8/1985 | Walker et al. | 423/349 |
| 4,642,227 | 2/1987 | Flagan et al. | 423/349 |
| 4,676,968 | 6/1987 | Sanjurjo et al. | 423/350 |
| 4,684,513 | 8/1987 | Iya | 423/349 |
| 4,900,411 | 2/1990 | Poong et al. | 204/157.43 |
| 4,994,167 | 2/1991 | Flagan et al. | 75/367 |
| 5,037,503 | 8/1991 | Kajimoto | 156/620.1 |
| 5,139,762 | 8/1992 | Flagella | 423/349 |

*Primary Examiner*—Olik Chaudhuri
*Assistant Examiner*—Ken Horton
*Attorney, Agent, or Firm*—E. E. Spielman, Jr.

[57] ABSTRACT

The hydrogen content of polysilicon can be reduced by heat treatment. The process is preferably conducted on polysilicon particles in bead-like form produced by chemical vapor deposition in a fluidized bed. The heat treatment is preferably conducted at a temperature of 1020°–1200° C. for a time from about 6 hours to about 1 hour sufficient to reduce the hydrogen content, and insufficient to cause agglomeration of the particles being treated. In order to reduce the tendency of particles to agglomerate at the process temperature employed, the particle bed is preferably maintained in motion during the dehydrogenation. The products produced by the process can have a hydrogen content of 30 ppma or less. These improved products can be used to produce monocrystalline silicon for the production of semiconductor devices.

30 Claims, 3 Drawing Sheets

PROCESS FOR PREPARING POLYSILICON WITH DIMINISHED HYDROGEN CONTENT BY USING A FLUIDIZED BED WITH A TWO-STEP HEATING PROCESS

CROSS-REFERENCE TO RELATED APPLICATIONS

This application is a continuation-in-part of copending application Ser. No. 255,967 filed Oct. 11, 1988 now abandoned. Reference is made to two applications filed by M. F. Gautreaux and Robert H. Allen. They relate to a fluidized bed process for producing polysilicon and the products produced thereby. The applications are Ser. No. 4,116, now U.S. Pat. No. 4,820,587, filed Jan. 16, 1986 as a continuation-in-part of Ser. No. 899,906 filed Aug. 25, 1986 now abandoned, and Ser. No. 114,453 filed Oct. 28, 1987 now U.S. Pat. No. 4,784,840, as a continuation of Ser. No. 899,906 filed Aug. 25, 1986, now abandoned.

BACKGROUND OF THE INVENTION

Polysilicon of the type disclosed in the above-identified applications is composed of free flowing, approximately spherical particles. These particles can be transported and handled readily. Hence, such bead-like products offer crystal growers a product that is tailor-made for development of continuous melt replenishment systems used in production of monocrystalline silicon. Monocrystalline silicon is used in the production of semiconductor devices.

For a description of the polysilicon and process provided by Messrs. Gautreaux and Allen, the above-cited applications are incorporated by reference herein, as if fully set forth.

This invention relates to an upgrading improvement in the polysilicon disclosed in the above-mentioned applications. In a continuing effort to improve such polysilicon, it has been discovered that such product can be improved by a heat treatment which reduces the content of a volatile impurity, which is believed to be hydrogen.

Sanjurjo et al, U.S. Pat. No. 4,676,968 discloses a process for melt consolidating polysilicon powder. For melt consolidation, the powder is heated at a temperature above the melting point of silicon (1410° C.) The processes of this invention do not employ temperatures above silicon's melting point. Furthermore, an object of this invention is to produce heat treated polysilicon while avoiding melt consolidation. Accordingly, the processes of this invention markedly differ from the process of the Sanjuro et al patent Flagan et al., U.S. Pat. No. 4,642,227, discloses a method for producing large particles of materials, and more particularly, to a free space reactor for producing particles greater than a few microns (preferably in the range of 10–100 microns). The processes of this invention do not employ the residence times for maintaining polysilicon particles at temperatures which reduce the hydrogen concentration as seen in the present invention.

SUMMARY OF THE INVENTION

In a particular aspect, this invention relates to fluidized bed produced, semiconductor grade polysilicon having a hydrogen content reduced by a heat treatment. The heat treatment to reduce the amount of hydrogen impurity may be conducted using various techniques, for example, it may be conducted using a moving bed or a fluidized bed.

In a preferred embodiment, the hydrogen content of the upgraded product provided by this invention is about 30 ppma or less. Typically, the improved products of this invention are in bead-like form. In other words, the products of this invention are in the form of approximately spherical particles. In general, these particles may have a size range from 150 to 3000 microns. Preferably, these particles have a size range of from about 400 to about 1500 microns; and have an average size of from about 600 to about 1200 microns. Such products are free-flowing and readily transported and handled Thus, they are also eminently suited for continuous and semi-continuous processes for producing semiconductor grade monocrystalline silicon, and especially suited for such processes wherein hydrogen impurity is a problem.

DESCRIPTION OF THE DRAWINGS

The samples were heated in a vertical quartz tube about 1 inch in diameter and several inches long. Prior to heating the samples, the tube was heated at 225° C. overnight to remove moisture and/or other materials which could interfere with the analysis. The weight of the polysilicon samples charged to the tube were within the range of 85–100 grams. The size of the tube allowed good contact between the bead surfaces and the gas phase. The tube was fitted with a thermowell, in which a thermocouple was inserted to permit accurate temperature measurement.

The tube and contents were heated to the temperature causing the polysilicon to outgas. The evolved gas was pumped to a reservoir. At intervals, (typically every ten minutes) the temperature and pressure of the reservoir, and of the sample tube were noted, allowing the calculation of the amount of gas released during the interval.

Some agglomeration of the beads was noted, particularly in the sample heated to 1091° C.

Figure 1:
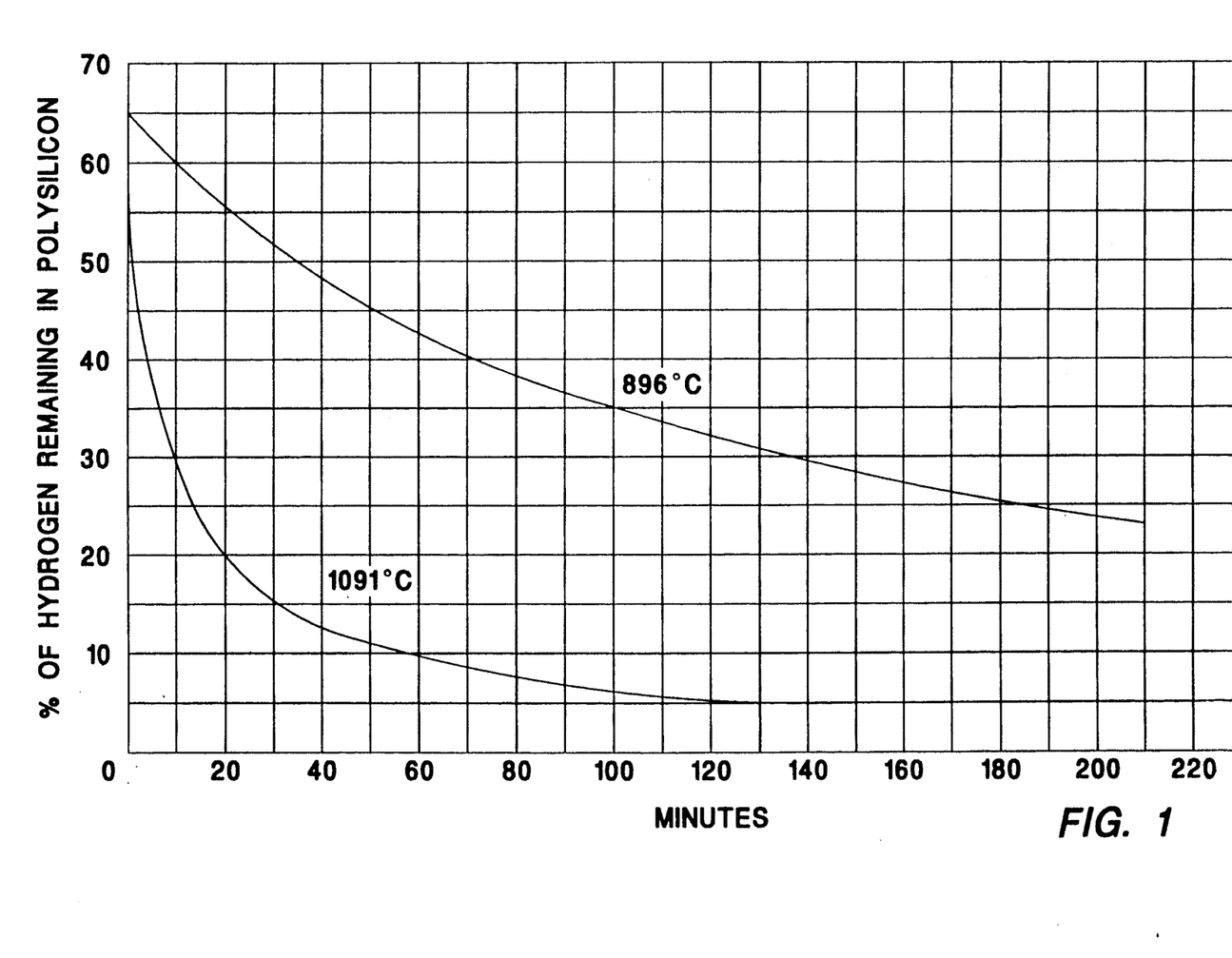
FIG. 1 illustrates the reduction in hydrogen content obtained by heating samples of polysilicon beads. As shown, one sample was heated at 896° C.; the other was heated at 1091° C. Each of the polysilicon samples weighed about 90 grams.

The initial concentration of hydrogen in the polysilicon was about 620 ppma. In the drawing, the percent hydrogen remaining at time zero is less than 100% because some hydrogen was removed during the period (approximately 30 minutes) required for the sample tube and contents to reach the test temperature. The circled points in the drawing represent data obtained from the following table. The curves show trends of the data at both temperatures.

TABLE I

| Time (minutes) | Polysilicon Dehydrogenation Fraction of Hydrogen Remaining | |
|---|---|---|
| | 896° C. | 1091° C. |
| 0 | 0.6178 | 0.6076 |
| 10 | 0.5717 | 0.2816 |
| 20 | 0.5306 | 0.1920 |
| 30 | 0.4963 | 0.1505 |

TABLE I-continued

| Time (minutes) | Polysilicon Dehydrogenation Fraction of Hydrogen Remaining | |
|---|---|---|
| | 896° C. | 1091° C. |
| 40 | 0.4656 | 0.1238 |
| 50 | 0.4389 | 0.1063 |
| 60 | 0.4158 | 0.0923 |
| 70 | 0.3927* | 0.0823 |
| 80 | 0.3757 | 0.0742 |
| 90 | 0.3581 | 0.0742 |
| 100 | 0.3424 | 0.0689 |
| 110 | 0 3280 | 0.0629 |
| 120 | 0.3141 | 0.0589 |
| 130 | 0.3015 | 0.0551 |
| 140 | 0.2896 | 0.0515 |
| 150 | 0.2786 | 0.0494 |
| 160 | 0.2687 | 0.0471 |
| 170 | 0.2587 | |
| 180 | 0.2500 | |
| 190 | 0.2410 | |
| 200 | 0.2327 | |
| 210 | 0.2244 | |

*71 minutes

DESCRIPTION OF PREFERRED EMBODIMENTS

This invention relates to polysilicon having a volatile impurity removed. From chromatographic evidence, applicants believe that the removed impurity is hydrogen. However, the heat treatment used in the process of this invention may also remove other volatile impurities which are present in the polysilicon product to be upgraded In a particular aspect, this invention relates to a polysilicon product (upgraded by heat treatment) which was produced in a fluidized bed process Thus, the invention relates to improved polysilicon beads or bead-like particles. In a preferred embodiment, the polysilicon to be upgraded is a material which was produced in a fluidized bed by the thermal decomposition of silane.

Figure 3:
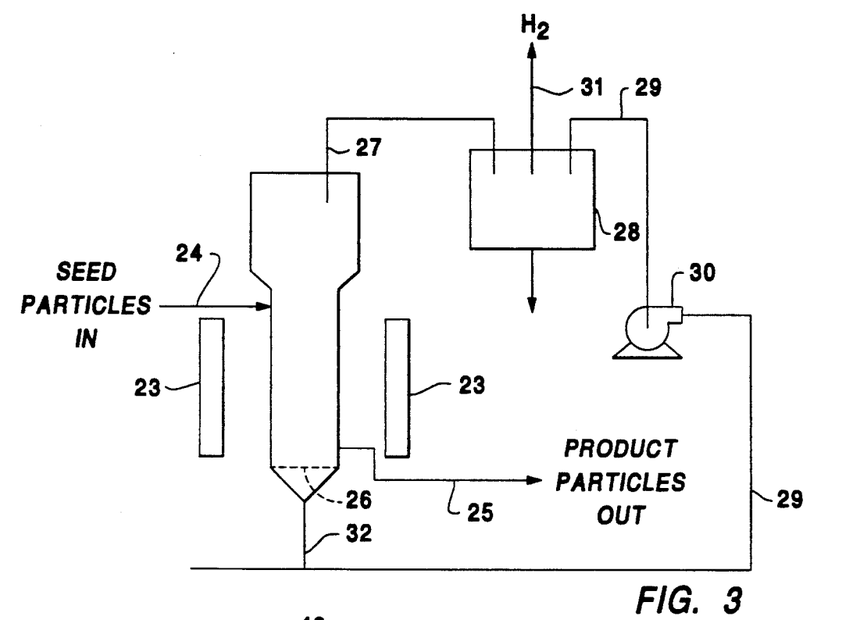

In important aspects, this invention comprises operation of a fluidized bed reactor. Reference to FIG. 3 will illustrate such an embodiment of this invention.

In that FIGURE, a fluidized bed reactor is illustrated by reactor 22 having a reaction zone containing particles of high purity silicon. The reactor is fitted with external heating means 23 surrounding the reactor zone, and sufficient to heat the bed of particles to an operation temperature above the decomposition temperature of silane. The reactor is fitted with feed line 24 for introduction of seed silicon particles, and line 25 for removal of larger-sized silicon particles formed by the process of the invention. The reactor has a gas distributor 26 which is a multiple pore device through which silane and hydrogen, or other carrier gas, is introduced into the bed of particles in the reactor. The pores of the distributor device are numerous, to facilitate intimate contact of the deposition gases with the particles in the reaction zone. Line 27 provides for exit of gases, (such as carrier gas, unreacted silane, and by-product hydrogen) admixed with silicon fines or dust particles formed during the process. The fines are removed by collection device 28. Hydrogen from the collection device can be recycled through line 29, pump 30 and a heat exchanger, not shown back into the reactor as carrier gas. The process is a net producer of hydrogen and therefore a portion of hydrogen from device 28 can be sent via line 31 to other uses, not part of this invention.

The hydrogen and silane are admixed and adjusted to desired concentrations by passage through metering and monitoring devices (not shown). After admixture, the resultant gas mixture enters the reactor device below distributor 26 via line 32. The incoming gas may be preheated if desired. To prevent fouling and plugging, distributor 26 may be fitted with cooling means, (not shown).

Preferably, the reactor is first operated under high productivity conditions, for example by using a deposition gas containing 10 to 100 mole percent silane and a process temperature of preferably 620° C.–750° C. When operated in this manner a significant amount of silicon metal dust or fines is formed as a co-product. Some of this is removed by line 27 and collected in collection device 28, as described above. Other dust particles are deposited on the surface of the larger silicon particles in the fluidized bed, and can cause problems on handling after the larger particles are removed from the device.

The amount of silane introduced into the reactor as a second deposition gas generally consists essentially of 1–5 mole percent silane in an inert carrier gas. Such a silane concentration favors chemical vapor deposition substantially free of homogeneous decomposition at the preferred process temperature, 620°–650° C.

If product particles are removed from the reactor after the second deposition, the amount of readily removable surface dust will have been reduced by a considerable extent. Stated another way, a significant amount of the surface dust deposited on the particle surfaces during the high productivity operation will have become glued on, bonded or united, i.e. made to adhere to the larger particles by the thin layer deposited from the second deposition gas. The dust or fines are typically composed of particles about 02–0.5 microns in size; the particles on which the silicon deposition take place preferably have a surface mean diameter of about 400–1000 microns, more prefereably about 400 to about 700 microns. Generally, during the second deposition homogeneous decomposition of silane cannot be entirely avoided and consequently some additional dust is deposited upon silicon particles in the bed. However, since the second deposition is conducted under conditions which heavily favor heterogeneous deposition, the amount of additional dust deposited is relatively small. However, some dust may remain on the particles after the cementing operation and may be produced by that operation.

Generally, there is a threshold or minimum gas velocity required to keep the particle bed in a fluidized state. Operational velocities for input of deposition gas into the bed are generally somewhat above the minimum, $U_{min}$. In many instances, the operation velocity U, is 1 to 10 times $U_{min}$; preferred velocities are $1.2 \leq U/U_{min} \leq 8$; more preferably, $1.5 \leq U/U_{min} \leq 3.5$.

As immediately recognizable by a skilled practitioner, it is necessary that the process be conducted above the decomposition temperature of silane; i.e., above about 500° C. Thus, suitable means must be provided so that the deposition gas being contacted with the silicon particles is above the temperature at which silane thermal decomposition begins to take place. The process temperature is further selected so that the relative rates of (a) deposition of silicon on the particle surfaces compare to the (b) rate of fines formation via homogeneous gas phase decomposition is within acceptable limits. Thus, it is preferred that the process temperature be within the range of from about 590° C. to about 650° C; more preferably from about 620° to about 650° C. The temperature can be any temperature between the thermal decomposition temperature of silane and the melting point of silicon. The preferred temperatures given above are selected for use with silane and by such considerations as level of impurities picked up from feed lines in the reactor employed, and the degree of homogeneous decomposition. Utilizing a different system or a different degree of homogeneous decomposition, the process can be operated very well with different preferred temperatures. For example, when using dichlorosilane as a source of silicon, temperatures employed can be within the range of from about 800° C. to about 900° C. When using trichlorosilane the temperature can be within the range of from about 1000° C. to about 1100° C. Generally speaking, the amount of dust formed with halogenated silanes is less than that formed when silane is used as the vaporous silicon-containing compounds within the deposition gas. Usually the temperature for the first and second mode are about the same since it is inconvenient to change the temperature because of the high heat capacity of the apparatus; especially when it is comparatively large in size.

The process of this invention is conducted using a fluidized bed of silicon particles. These particles are of sufficient purity to be acceptable for the use intended. The seed particles used to prepare particles in the bed can be prepared by this invention followed by reducing particle size to an average of 200 microns with an 80-400 microns range. Seed particles can be irregular in shape. They tend to become substantially spherical during operation of the reactor.

Figure 4:
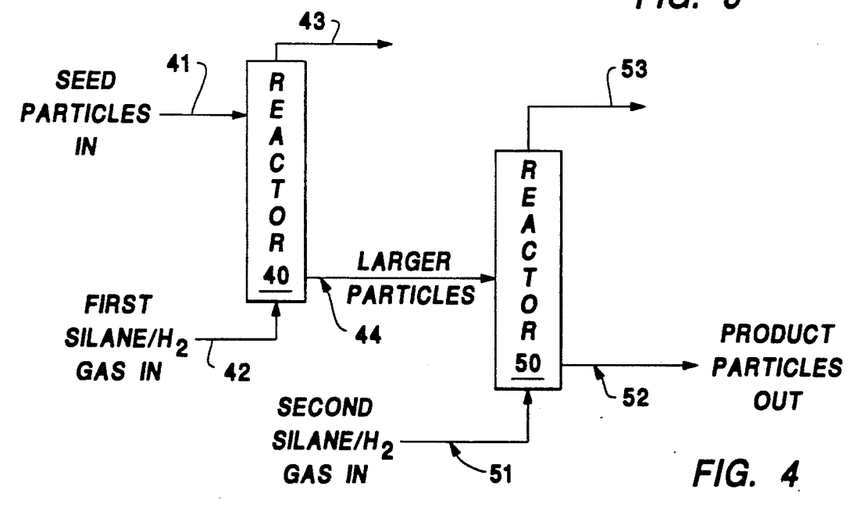

In FIG. 4, reactor 40 is a fluidized bed reactor substantially as described above and as depicted in FIG. 3. The reactor is charged with a bed of silicon seed particles from line 41 near the top of the reactor, as shown. Under the selected reaction conditions within the teachings above, the bed is fluidized and the particles therein contacted with the first deposition gas. It is preferred as discussed above that this first gas be a mixture of SiH$_4$ and H$_2$ (designated by "FIRST SILANE/H$_2$ GAS" in the drawing). This gas is introduced into the reactor via line 42. In the reactor, deposition of silicon and decomposition of silane occurs as above described, resulting in growth of the silicon particles, deposition of silicon fines on the surface of said particles, and elutriation of additional fines with carrier gas and by product hydrogen through exit line 43 at the top of the reactor. After the particle growth, a portion of the bed of particles is taken off by line 44 near the bottom of the reactor. This is replaced in the first reactor with additional seed particles and the first deposition in that reactor continued.

Line 44 is connected to fluidized bed reactor 50 such that particles with surface silicon dust are transferred from reactor 40 to reactor 50. In reactor 50 the second deposition gas, i.e., designated "SECOND SILANE/H$_2$ GAS" in the drawing is introduced through line 51. After cementing dust on the particle surfaces, product particles are removed through line 52. Gas and any elutriated fines exit the reactor through line 53. Hydrogen produced in either or both reactors can be recycled to either or both reactors after admixture with silane, or sent on for other usage.

The process of this invention produces a highly desirable polysilicon product useful for the product of silicon semiconductor devices. The product in the form of approximately spherical particles. These are free flowing, and therefore can be handled much more readily by mechanized systems than the rods formed by the Siemen's process. Mechanical systems can be designed for storage, and handling of the free flowing material produced by this invention which decrease the chances for contamination.

Accordingly, in one embodiment, this invention relates to silane-derived, fluidized bed produced, semiconductor grade polysilicon having a low hydrogen content. The low hydrogen content is achieved by heating the polysilicon for a time and at a temperature sufficient to remove hydrogen from the polysilicon. As an example, a polysilicon product produced in a fluidized bed by the thermal decomposition of silane may contain from about 100 to about 1000 ppma hydrogen. After the heat treatment conducted according to the process of this invention, the polysilicon can have a hydrogen content of 30 ppma or less. The hydrogen removal step can be conducted as an operation separate from and subsequent to the formation of polysilicon in a fluidized bed.

Thus, this invention relates to a process for heating silane-derived polysilicon (preferably in the form of beads or bead-like particles) for a time and at a temperature sufficient to reduce the hydrogen content of the polysilicon. Thus, in another preferred aspect, this invention comprises a process for heat treating silane-derived polysilicon in the form of beads, preferably having a size within the range of from about 150 to about 1500 microns, said process comprising heating said polysilicon in hydrogen at a temperature and for a time (a) sufficient to reduce the hydrogen content of said beads, and (b) insufficient to melt consolidate said polysilicon beads. The beads are preferably kept in motion during the dehydrogenation period in order to diminish the amount of particle agglomeration. In general, agglomeration at comparatively high dehydrogenation temperatures increases if the particles are static, i.e. not in motion during the heating period.

Agglomeration tends to take place when the dehydrogenation temperature is high enough to soften the polysilicon particles being treated. For this reason, temperatures above about 1200° C. are generally avoided although slight excursions above that temperature can be tolerated in some instances. Generally, the process temperature is kept considerably below the melting point of silicon, 1410° C.

Thus, in still another preferred embodiment this invention relates to a process for dehydrogenating silane-derived polysilicon beads having a size range of from about 150 to about 3000 microns, preferably 400 to 1500 microns, said process comprising heating said beads in a fluidized bed at a temperature of from about 1020° C. to about 1200° C., and at ambient pressure, for a residence time sufficient to reduce the hydrogen content of said beads, said beads being maintained during said heating in fluidized suspension by motive force supplied by a stream of gas selected from hydrogen and the gases of Group VIII of the Periodic Table.

As indicated above, a fluidized bed method need not be used. Moving bed methods can also be employed if desired.

For this invention, a preferred polysilicon for upgrading is a material of the type disclosed in the above-cited applications of Gautreaux and Allen. Polysilicon products produced by the method disclosed in those applications generally will contain some hydrogen. The hydrogen content appears to be a function of the operating conditions employed Generally speaking, it appears that the hydrogen content is inversely proportional to the process temperature used. In other words, use of lower temperatures for decomposition of silane, results in higher content of hydrogen in the product particles.

Polysilicon produced by the fluidized bed method of Gautreaux and Allen is in the form of free-flowing, approximately spherical beads. In general, the size distribution of such starting materials has a range of from about 150 to about 1500 microns. A typical size range is about 400 to about 1500 microns. The particle density in grams per cubic centimeter is typically within the range of 2.25 to 2.33; a typical average is 2.30 to 2.31. Preferred materials have a bulk density of about 1360 kg/m$^3$. Surface dust is typically less than 0.1 percent, .e.g. 0.010–0.070 weight percent. A typical material of this type which can be used as a starting material for this invention is a silane-derived, semiconductor grade, polysilicon characterized in that:

(i) it is in bead-like, approximately spherical form,
(ii) has a surface morphology illustrated by FIGS. 3 and 3A of application Serial No. 4,116,
(iii) has a size distribution of from about 400–1500 microns,
(iv) has a boron content within the range of 0.01–0.25 ppba,
(v) has a phosphorus content within the range of 0.01–0.19 ppba, and
(vi) has a carbon content within the range of 0.16–0.33 ppm, said particles being in admixture with less than about 0.08 percent of silicon dust particles having a size up to 10 microns. Such polysilicon is free flowing, readily handleable and transportable, and suitable for continuous melt replenishment systems for producing monocrystalline silicon.

The average size of silane-derived, semiconductor grade polysilicon particles is from about 600 to about 1200 microns; most preferably averaging between about 800 and about 1000 microns.

As stated above, the process of this invention can be conducted using a polysilicon containing from about 100 to about 1000 ppma hydrogen. It is to be understood, however, that this invention can be applied to polysilicon containing a greater or lesser amount of hydrogen impurity. There is no real upper limit on the amount of hydrogen in the polysilicon to be upgraded With regard to a lower limit, one does not use as a starting material a polysilicon having a hydrogen content which cannot be reduced by treatment at the operating temperature and time selected For example, as shown in the drawing of FIG. 1, the rate of reduction in hydrogen content is not large after a certain operating time Furthermore, at any given temperature there appears to be a polysilicon hydrogen content which cannot be reduced further for an economically feasible reaction period Thus, the hydrogen content is a process criterion to be considered.

In this invention, the polysilicon to be upgraded is heated at a temperature and for a time sufficient to reduce the hydrogen content of the particles being treated, and insufficient to melt consolidate, i.e. agglomerate, the particles by sintering. It has been discovered that process temperatures of from about 1020° C. to about 1200° C. result in satisfactory diffusion rates and practical reactor sizes. Higher temperatures greatly increase the sintering rate as the melting point of silicon is neared. Lower temperatures require impractical, i.e. uneconomic, reaction times.

Generally speaking, reaction times of less than about 10 hours are preferred. More preferably, reaction time is within the range of from about 1 to about 6 hours, with most preferable times being in the range of from about 2 to about 4 hours. The reaction time is not a truly independent variable, but is dependent to an appreciable extent on the reaction temperature employed. In general, the higher the reaction temperature the shorter the dehydrogenation time required.

The dehydrogenation of this invention proceeds well at ambient pressure; However, higher and lower pressures can be used if desired. In general, pressures higher than ambient retard the removal of volatile substance from the polysilicon particles being treated, and subatmospheric pressures facilitate the process. When selecting a subatmospheric pressure, cost considerations should be borne in mind. There is no real lower limit on the pressure employed, and an operator can select any subatmospheric pressure desired, e.g. down to one torr or lower.

To facilitate contact of the polysilicon particles with the vapor phase in order to promote diffusion of hydrogen from the particles, and also to reduce the tendency of particles to agglomerate at the process temperature employed, the particle bed is preferably maintained in motion during the dehydrogenation process. Thus, as stated above, one may use a moving bed or a fluidized bed apparatus. A preferred process utilizes a fluidized bed. Fluidized beds result in higher heat transfer rates between solid and fluid compared to other conventional modes of contact (an important factor in high temperature operation). Furthermore, the smooth flow of fluidized particles promotes ease of handling.

Figure 2:
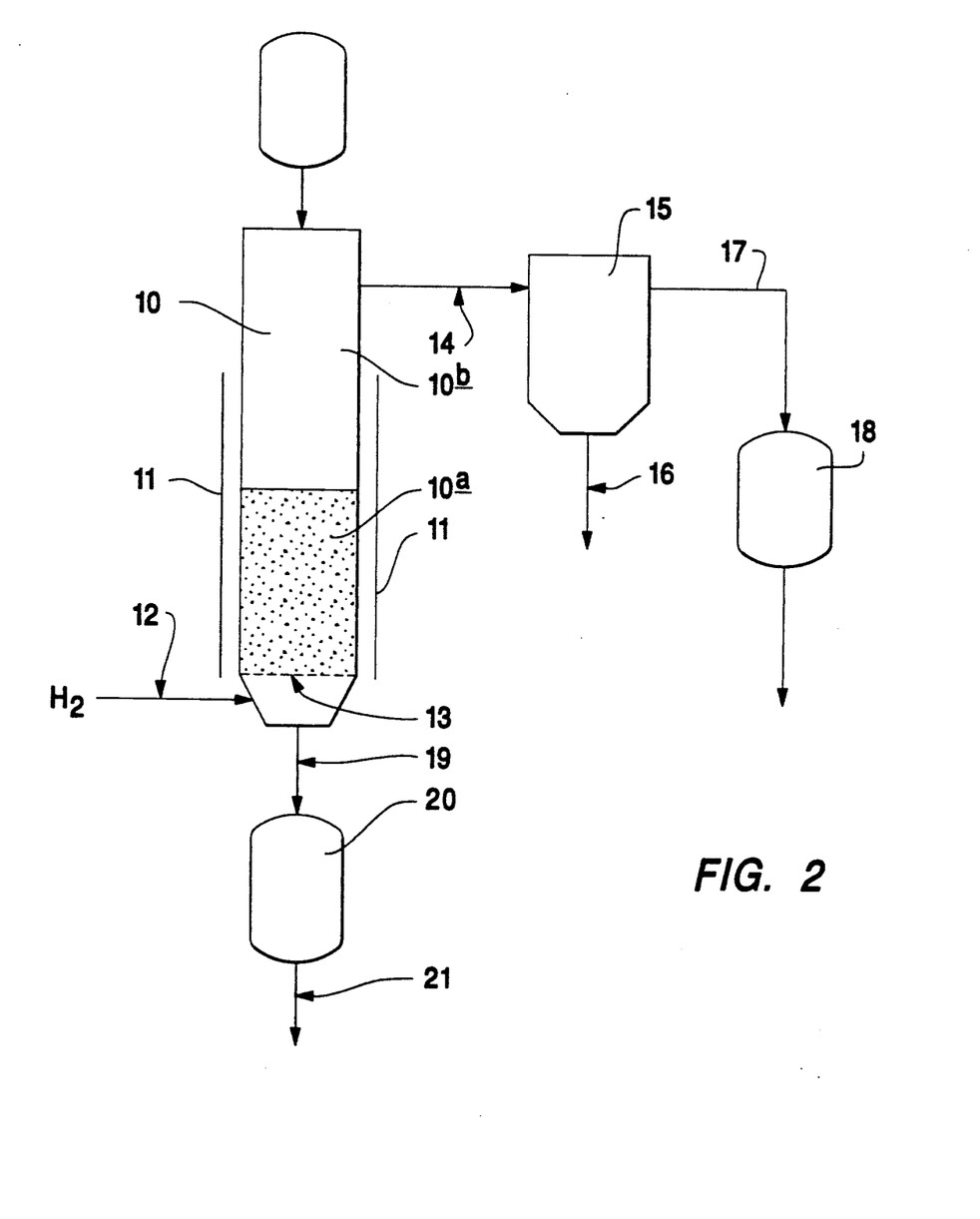
FIGS. 2, 3, and 4 are representations, partially in cross-section and not to scale, at fluidized bed apparatus for use in this invention.

Referring to the drawing, a fluidized bed reactor 10 can be employed in our dehydrogenation process. In the reactor is fluidized bed 10a, comprising polysilicon particles being upgraded by dehydrogenation. The reactor has free space 10b above the fluidized bed. The bed is heated to process temperature by radiant heater 11 which surrounds reactor 10. The bed of particles is maintained in a fluidized state by a stream of hydrogen gas which enters reactor 10 through line 12. After entering the reactor near the base thereof, the stream of motive gas flows through distributor 13 into the particle bed. Distributor 13 has multiple orifices in order to distribute the flow of motive gas throughout the bed, and maintain it in fluidized suspension. Prior to entering the reactor, the motive gas can be heated by any suitable heating device (not shown). For example, the motive gas can be heated to a temperature of 325° C. or above.

The motive gas exits the reactor through line 14 near the top thereof, and then flows into solids filter 15. Polysilicon dust which is entrained in the gas exit stream is removed by the solids filter. By-product solids are removed from the filter through line 16. Effluent gas with solids removed is discharged through line 17. If desired, the effluent gas can be recycled (after purification in purification zone 18, if necessary).

After dehydrogenation, the upgraded product is removed via line 19 to product cooler/collector 20. As required, dehydrogenated product can be removed from the cooler/collector via line 21.

A preferred mode of operation of the fluidized bed is semi-batch in which about 10 to about 20 weight percent of the total bed mass is withdrawn and a similar quantity of untreated material is charged every cycle (typically 1 to 3 hours). After the withdrawn product is cooled to a suitable handling temperature, approximately 50°-60° C., the hydrogen atmosphere surrounding the withdrawn pellets is replaced with an inert gas such as argon, and the polysilicon product appropriately packaged to prevent or substantially prevent contamination. The packaging is conducted under an argon atmosphere.

It is not necessary to use hydrogen as the motive gas; other gases can be employed if desired. When hydrogen is used as the motive gas, conflicting hydrogen diffusion mechanisms occur. On the one hand, hydrogen diffuses out of the particles being treated. At the same time, hydrogen in the gaseous phase near the polysilicon beads tends to diffuse into the particles. The net result of these two opposing mechanisms determines the overall effectiveness of the dehydrogenation treatment. The opposing mechanisms are discussed below.

At any given process temperature employed, hydrogen within the polysilicon particles has a certain tendency to diffuse out of the particles and into the surrounding gas phase. The hydrogen diffusion rate is dependent, at least to some extent, upon (a) the concentration of hydrogen in the particles and (b) the microscopic structure of the polysilicon particles. Some hydrogen diffuses out of the particles by traveling between the silicon atoms in the crystalline matrix. Other hydrogen tends to leave the particles via voids or interfaces between crystalline surfaces in the particles.

On the other hand, hydrogen within the gaseous fluid surrounding the particles has a. tendency to diffuse into the particles. This tendency depends at least to some extent on the hydrogen concentration in the gas phase. As the concentration of hydrogen increases, the rate of hydrogen diffusion into the particles also increases.

The net result of diffusion in and out of the particles during heat treatment determines the final hydrogen concentration. Thus, when hydrogen is used as the motive gas, the particles produced by the process of this invention will still have some small amount of hydrogen remaining. All conditions being equal, this final hydrogen concentration will be greater than when some other motive gas not containing hydrogen, e.g. argon, is employed in the process.

As appreciated by a skilled practitioner, when a fluidized bed apparatus is used to conduct the process of this invention, a flow of gas imparts motion to the particles being treated. When a moving bed is employed, particle motion is imparted by some other motive force, e.g. gravity.

To prepare polysilicon suitable for use in preparation of semiconductor devices, the process of this invention should be conducted under conditions which eliminate or substantially eliminate contamination of the polysilicon product. Thus, for example, the vessel in which the polysilicon is heat treated should be one in which the particles are exposed only to high purity silicon and high purity fluids. Thus, it is preferred that the parts of the vessel to which the particles are exposed, be fabricated from or coated with high purity silicon.

The polysilicon which is used as a starting material for the process of this invention, and which is made according to the process described in the above-mentioned applications of Gautreaux and Allen typically has a surface dust content of about 0.1 weight percent or less. The process of this invention may reduce the surface dust content. In general, the reduction in surface dust is greater when higher operating temperatures are used, and when the process of this invention is conducted while using a stream of motive gas to fluidized the polysilicon particles being treated.

With regard to the flow of motive gas, there is a threshold or minimum gas velocity required to keep the particle bed in a fluidized state. Operational velocities for this invention are generally somewhat above this minimum, $U_{min}$. In many instances the operation velocity, U, is 1 to 10 times $U_{min}$; preferably $U/U_{min}$ is 1.05 to 3.5.

EXAMPLE 1

Polysilicon of the type described in the above-cited applications of M. F. Gautreaux and Robert H. Allen was heated at a temperature of 776.2°±14.6° C. The initial hydrogen concentration in the polysilicon was 619 ppma. The hydrogen concentration at various times is noted in the following table.

TABLE II

| Hours | $H_2$ Content (ppma) |
|---|---|
| 1 | 579 |
| 2 | 501 |
| 3 | 458 |
| 4 | 424 |
| 5 | 403 |
| 6 | 374 |

The hydrogen content reducing process of this example can be conducted using semiconductor grade, silane-derived, fluidized bed-produced polysilicon composed of approximately spherical particles having a size range of 150/1500 microns, and a hydrogen content of 100/1000 ppma. The process can be conducted for from 1 to about 6 hours using a temperature within the range of about 1020° to about 1200° C., preferably at a process time of from about 2 to about 4 hours. The process is preferably conducted while maintaining the particles in motion in a moving bed apparatus or a fluidized bed apparatus. When a fluidized bed method is used, the levitating gas can be selected from hydrogen, argon, neon, xenon, and similar non-contaminating inert gases. The process produces a reduction in hydrogen content, for example below 30 ppma. Preferred polysilicon produced by the process of this invention contains from about 5 to about 25 ppma hydrogen.

EXAMPLE 2

Twenty pounds of silane-derived, fluidized bed produced, semiconductor grade polysilicon was charged to a fluidized bed reactor, and maintained in a fluidized bed state using a levitation hydrogen flow of about 182.8 SCFH. After the bed temperature reached 920° C., another eight pounds of polysilicon was charged.

The bed was maintained in fluidized motion at 910° C. for eight hours. Thereafter, a sample was taken. Analysis indicated that the surface silicon dust content was 0.006 weight percent. The surface dust value of the silicon charged to the reactor was 0.071 weight percent The hydrogen content of the polysilicon charged was reduced from 884 ppma to 11 ppma.

As a further illustration of the process of this invention, a mass of polysilicon particles of 700 microns average diameter is fluidized with hydrogen using a hydrogen flow rate for fluidization of $U/U_{min}=1.5$. The bed temperature is kept at 1100° C. for an average particle residence time of 12.67 hours.

The reactor surfaces exposed to the polysilicon being treated are composed of a non-contaminating substance such as high purity silicon.

The above process will reduce the hydrogen content of polysilicon from 1000-1200 ppma to about 50 ppma. If the polysilicon charged has an initial hydrogen concentration of about 600 ppma, the concentration will be reduced to a value within the range of 20-25 ppma.

After reduction of the hydrogen content of the particles in the process described above, the particles are cooled in a product cooler. Generally speaking, the particles are cooled to a temperature in the range of 60°-65° C. prior to removal of the product to a product hopper.

As can be seen, the dehydrogenation process of this invention can be an operation separate and distinct from the process in which the polysilicon beads are formed. Furthermore, as can be seen by the above description, dehydrogenation of polysilicon according to this invention can be conducted subsequent to the preparation of the polysilicon beads, which are to be dehydrogenated. A skilled practitioner having the above-detailed description of the invention can make modifications and changes of the embodiments described above, without departing from the scope or spirit of the invention as defined by the appended claims.

It will be readily apparent that this invention is susceptible to considerable variation in its practice within the spirit and scope of the appended claims, the forms hereinbefore presented being merely illustrative thereof.

We claim:

1. A method for producing polysilicon particles having a reduced hydrogen content, said process comprising:
   (a) forming polysilicon particles which have a size within the size range of from about 150 to about 3000 microns, the formation being by a process which comprises thermally decompositing silane in a first fluidized bed comprised of silicon particles whereby the silane metal produced from the thermal decomposition of the silane is deposited on the particles; and
   (b) subjecting the formed particles to heat in a second fluidized bed or a moving bed in the presence of a non-contaminating inert gas for a time and at a temperature of from about 890° C. to about 1200° C., which temperature exceeds the first fluidized bed temperature, whereby the combination of the time and the temperature in the second fluidized bed are sufficient to reduce the hydrogen content of the formed particles but insufficient to melt-consolidate the particles.

2. The process of claim 1 wherein the formed particles have a size distribution of from about 400 to about 1500 microns.

3. The process of claim 1 wherein the temperature in the first fluidized bed is within the range of from about 590° C. to about 650° C.

4. The process of claim 1 wherein the temperature in the first fluidized bed is within the range of from about 620° C. to about 650° C.

5. The process of claim 1 wherein the temperature in the second fluidized bed or moving bed is within the range of from about 1020° C. to about 1200° C.

6. The process of claim 5 wherein the temperature in the first fluidized bed is within the range of from about 590° C. to about 650° C.

7. The process of claim 5 wherein the temperature in the first fluidized bed is within the range of from about 620° C. to 650° C.

8. The process of claim 2 wherein the temperature in the first fluidized bed is within the range of from about 620° C. to 650° C. and wherein the temperature in the second fluidized bed or moving bed is within the range of from about 1020° C. to about 1200° C.

9. The process of claim 1 wherein the time in the second fluidized bed is within the range of from about 1 to about 6 hours.

10. The process of claim 1 wherein the time in the second fluidized bed is within the range of from about 2 to about 4 hours.

11. The process of claim 8 wherein the time in the second fluidized bed is within the range of from about 1 to about 6 hours.

12. The process of claim 2 wherein the formed particles have an initial hydrogen content within the range of from about 100 to about 1000 ppma, the temperature within the first fluidized bed is within the range of from about 500° C. to about 750° C., and the temperature within the second fluidized bed is within the range of from about 1020° C. to about 1200° C.

13. The process of claim 12 wherein the hydrogen content of at least one formed particle is reduced to a level which is below 30 ppma hydrogen.

14. A method for producing polysilicon particles having a reduced silicon dust and hydrogen content, said process comprising:
   (a) forming polysilicon particles which have at least a portion of their surface covered with fine silicon dust, the formation being by a process which comprises thermally decomposing silane in a first fluidized bed comprised of silicon particles whereby the silane metal produced from the thermal decomposition of the silane is deposited on the particles; and
   (b) subjecting the formed particles to heat in a second fluidized bed or a moving bed in the presence of a non-contaminating inert gas for a time and at a temperature of from about 890° C. to about 1200° C., which temperature exceeds the first fluidized bed temperature, whereby the combination of the time and the temperature in the second fluidized bed are sufficient to reduce the amount of fine silicon dust covering the particle surfaces and are sufficient to reduce the hydrogen content of the formed particles but insufficient to melt-consolidate these particles.

15. The process of claim 14 wherein the formed particles have a size distribution of from about 400 to about 1500 microns.

16. The process of claim 14 wherein the temperature in the first fluidized bed is within the range of from about 590° C. to about 650° C.

17. The process of claim 14 wherein the temperature in the first fluidized bed is within the range of from about 620° C. to about 650° C.

18. The process of claim 14 wherein the temperature in the second fluidized bed is within the range of from about 1020° C. to about 120° C.

19. The process of claim 18 wherein the temperature in the first fluidized bed is within the range of from about 590° C. to about 650° C.

20. The process of claim 18 wherein the temperature in the first fluidized bed is within the range of from about 620° C. to 650° C.

21. The process of claim 14 wherein the temperature in the first fluidized bed is within the range of from about 620° C. to 650° C. and wherein the temperature in the second fluidized bed is within the range of from about 1020° C. to about 1200° C.

22. The process of claim 14 wherein the time in the second fluidized bed is within the range of from about 1 to about 6 hours.

23. The process of claim 14 wherein the time in the second fluidized bed is within the range of from about 2 to about 4 hours.

24. The process of claim 15 wherein the time in the second fluidized bed is within the range of from about 1 to about 6 hours.

25. The process of claim 15 wherein the formed particles have an initial hydrogen content within the range of from about 100 to about 1000 ppma, the temperature within the first fluidized bed is within the range of from about 500° C. to about 750° C., and the temperature within the second fluidized bed is within the range of from about 1020° C. to about 1200° C.

26. The process of claim 25 wherein the hydrogen content of at least one formed particle is reduced to a level which is below 30 ppma hydrogen.

27. In a process for preparing particulate polysilicon, which process comprises: (a) a productivity mode in which silicon seed particles are contacted, in a fluidized bed, with a gas comprising from about 10 to about 100 mol % silane at a temperature which causes the thermal decomposition of the silane whereby silicon metal resulting from such decomposition is deposited on the seed particles to yield intermediate silicon particles and whereby silicon dust is formed which deposits on the surfaces of such intermediate silicon particles; and (b) a quality mode which comprises contacting, in a fluidized bed, the intermediate particle having surface dust with a gas comprising from about 1 to about 5 mol % silane at a temperature above the thermal decomposition temperature of the silane whereby a silicon metal layer is deposited on the intermediate particles which cements at least a portion of the silicon dust to the intermediate particles, the improvement which comprises subjecting the intermediate particles which have at least a portion of the silicon dust cemented thereto to heat a fluidized bed or a moving bed in the presence of a non-contaminating inert gas for a time and at a temperature which exceeds the fluidized bed temperatures used in forming such cemented intermediate particles so that the hydrogen content of such cemented intermediate particles is reduced, the temperature however being insufficient to melt-consolidate the cemented intermediate particles.

28. The process of claim 27 wherein the cemented intermediate particles have particles have a size within the range of from about 150 to about 1500 microns.

29. The process of claim 27 wherein the temperature used to reduce the hydrogen content of the cemented intermediate particles is within the range of from about 890° to about 1200° C.

30. The process of claim 27 wherein the temperatures in the fluidized beds used to form the intermediate particles and to cement the dust to the surfaces of the intermediate particles are within the range of from 500° C. to about 750° C.

* * * * *

UNITED STATES PATENT AND TRADEMARK OFFICE
CERTIFICATE OF CORRECTION

PATENT NO. : 5,242,671
DATED : September 7, 1993
INVENTOR(S) : Robert H. Allen
James E. Boone It is certified that error appears in the above-indentified patent and that said Letters Patent is hereby corrected as shown below:

Column 11, Line 39, reads "... decompositing silane in" and should read -- decomposing silane in --.

Column 12, Line 62, reads "... about 120°C." and should read -- about 1200°C. --.

Column 14, Line 11, reads "... to heat a fluidized" and should read -- to heat in a fluidized --.

Column 14, Line 21, reads "... particles have particles have ..." and should read -- particles have --.

Signed and Sealed this

Twenty-eighth Day of June, 1994

BRUCE LEHMAN

*Attest:*

*Attesting Officer*        *Commissioner of Patents and Trademarks*